United States Patent
Bigelow et al.

(10) Patent No.: US 10,800,418 B2
(45) Date of Patent: Oct. 13, 2020

(54) SYSTEMS, METHODS, AND APPARATUSES FOR CONTROLLING ENGINE OPERATIONS

(71) Applicant: Powerteq LLC, Ogden, UT (US)

(72) Inventors: David Brinton Bigelow, West Haven, UT (US); Ashley David Brimhall, Kaysville, UT (US); John Carl Lagerquist, Jr., Pleasant View, UT (US)

(73) Assignee: Powerteq LLC, Ogden, UT (US)

( * ) Notice: Subject to any disclaimer, the term of this patent is extended or adjusted under 35 U.S.C. 154(b) by 34 days.

(21) Appl. No.: 16/118,606

(22) Filed: Aug. 31, 2018

(65) Prior Publication Data

US 2020/0070831 A1    Mar. 5, 2020

(51) Int. Cl.
*F02D 41/30*   (2006.01)
*B60W 30/182*  (2020.01)
(Continued)

(52) U.S. Cl.
CPC ........ *B60W 30/182* (2013.01); *B60W 50/082* (2013.01); *B60W 50/14* (2013.01);
(Continued)

(58) Field of Classification Search
CPC ................. F02D 41/28; F02D 41/3076; F02D 2041/281; B60W 30/182; B60W 50/082;
(Continued)

(56) References Cited

U.S. PATENT DOCUMENTS

| 4,199,039 A | 4/1980 | Ciemochowski |
| 4,232,372 A | 11/1980 | Berent |

(Continued)

FOREIGN PATENT DOCUMENTS

| AU | 2012216452 | 8/2012 |
| CA | 2787806 | 2/2014 |

(Continued)

OTHER PUBLICATIONS

Jet Performance Products; Power Control Module and Installation Instruction CD, 2016.

*Primary Examiner* — Hai H Huynh
(74) *Attorney, Agent, or Firm* — Middleton Reutlinger (57) ABSTRACT

Methods, apparatus, systems, and computer-readable media are provided for employing a mode expansion module to increase a number of operating modes in which a vehicle can operate. The mode expansion module can operate as a computing device, which can be connected to an existing vehicle for sending and receiving both sensor signals and engine control signals. The mode expansion module can be controlled by a user using an existing vehicle control switch that is connected to the vehicle, and can leverage connections to an existing display panel in the vehicle in order to indicate to the user the operating mode that has been selected. Furthermore, when a particular mode of the mode expansion module is selected, the mode expansion module can modify control commands being transmitted from an existing engine control module, and/or modify sensor signals being provided to the existing engine control module.

20 Claims, 5 Drawing Sheets

(51) Int. Cl.
  *B60W 50/14* (2020.01)
  *B60W 50/08* (2020.01)

(52) U.S. Cl.
  CPC ... *F02D 41/3076* (2013.01); *B60W 2050/146* (2013.01); *B60W 2510/06* (2013.01)

(58) Field of Classification Search
  CPC .......... B60W 50/14; B60W 2050/146; B60W 2510/06
  USPC ........ 123/480, 482, 486, 487, 488; 701/102, 701/103, 104, 105, 115
  See application file for complete search history.

(56) References Cited

U.S. PATENT DOCUMENTS

| | | |
|---|---|---|
| 5,444,628 A | 8/1995 | Meaney et al. |
| 6,119,670 A | 9/2000 | Lavi |
| 6,304,814 B1 | 10/2001 | Masters et al. |
| 6,535,811 B1 | 3/2003 | Rowland et al. |
| 6,721,648 B2 | 4/2004 | Masters et al. |
| 6,741,925 B2 | 5/2004 | Masters et al. |
| 6,820,602 B1 | 11/2004 | Masters et al. |
| 7,050,899 B2 | 5/2006 | Masters et al. |
| 7,066,155 B2 | 6/2006 | Uhde et al. |
| 7,113,077 B2 | 9/2006 | Masters et al. |
| 7,145,324 B2 | 12/2006 | Masters et al. |
| 7,165,542 B2 | 1/2007 | Masters et al. |
| 8,718,905 B2 | 5/2014 | Mosher et al. |
| 8,738,270 B2 | 5/2014 | Emberson et al. |
| 9,441,571 B2 | 9/2016 | Petersen et al. |
| 9,488,116 B2 | 11/2016 | Mosher et al. |
| 9,727,325 B2 | 8/2017 | Mizell et al. |
| 9,989,005 B1 | 6/2018 | Silverstri et al. |
| 10,053,105 B2 * | 8/2018 | Foster ............... B60W 30/1888 |
| 10,086,698 B2 * | 10/2018 | Grajkowski ........... B60K 26/04 |
| 2006/0041337 A1 | 2/2006 | Augsburger et al. |
| 2008/0319618 A1 * | 12/2008 | Sjogren ................... F02D 29/02 701/50 |
| 2014/0046574 A1 | 2/2014 | Eisenbarth et al. |
| 2017/0341603 A1 | 11/2017 | Milliken |
| 2018/0357842 A1 | 12/2018 | Ulsamer |

FOREIGN PATENT DOCUMENTS

| | | |
|---|---|---|
| WO | 2006023713 | 3/2006 |
| WO | 2018231622 A1 | 12/2018 |

* cited by examiner

SYSTEMS, METHODS, AND APPARATUSES FOR CONTROLLING ENGINE OPERATIONS

TECHNICAL FIELD

The implementations set forth herein relate to engine control modules. Specifically, the implementations set forth herein relate to systems, methods, and apparatuses for employing an engine control module to enable supplemental engine operating modes.

BACKGROUND

Vehicles are often designed for efficiency, at least with respect to their expected operational tasks. For instance, a vehicle that is expected to operate daily on a highway maybe designed to have a better fuel economy, whereas a vehicle that is expected to frequently carry large loads, may be designed to exhibit more power or load carrying capacity. However, typically once a vehicle has been manufactured, the vehicle may only have a finite number of operating modes. When a manufacturer seeks to expand a number of operating modes, they typically design a new version of a vehicle. This can be a waste of resources and energy considering many vehicles remain operational for decades. For instance, the amount of electricity and/or gas involved in manufacturing materials for an automobile can be excessive depending on the type of automobile being manufactured. Furthermore, certain portions of an automobile may not be recyclable, therefore discarding portions of currently available cars can limit the efficiency of the manufacturing process for future vehicles.

SUMMARY

The present disclosure is generally directed to methods, apparatus, and computer-readable media (transitory and non-transitory) for providing a mode expansion module that broadens a number of operating modes available at a vehicle. The mode expansion module can be an apparatus having a computing device, and one or more interfaces capable of sending and/or receiving signals to and from one or more components of a vehicle, for increasing a number of operating modes of a vehicle. The interfaces can be arranged to allow existing cables of a vehicle to be connected to the mode expansion module, in order that the mode expansion module can intercept particular signals be communicated at least within the vehicle. For instance, in order to turn on and off the mode expansion module, and change operating modes of the mode expansion module, the user can use an existing control of the vehicle in order to operate the mode expansion module. The existing control can be, for example, a cruise control switch, which can be a switch that is capable of providing an on-off signal for a cruise mode of the vehicle, and an increase and a decrease signal changing a speed of the vehicle while the vehicle is operating in the cruise mode. The existing control can be manufactured by a first manufacturer and the mode expansion module can be manufactured by a second manufacturer that is different from the first manufacturer. Additionally, or alternatively, the mode expansion module can be developed subsequent to the complete manufacturing of the vehicle, therefore some amount of reverse engineering can be used in order to ensure operability of the mode expansion module with respect to a particular vehicle.

In some implementations, the mode expansion module can intercept the "on" signal from the existing control to cause the mode expansion module to turn on. In this way, the mode expansion module would be operated by the existing control instead of, or in addition to, the cruise mode. When the mode expansion module has been turned on in response to receiving the on signal, the user can then select an operating mode of the mode expansion module by using the existing control to provide the increase or decrease signal. The mode expansion module can intercept the increase and decrease signals in order to cause an operating mode of the mode expansion module to change. In some implementations, the mode expansion module can at least temporarily intercept display signals that would otherwise go to a portion of a display panel of the vehicle, at least directly or indirectly, in order to indicate a selected mode. For example, the mode expansion module can intercept a sensor output that would otherwise indicate a gear being employed by the vehicle (e.g., a "$1^{st}$" gear), and modify the signal so that the display panel indicates the selected operating mode (e.g., a "$3^{rd}$" mode). In other words, while the mode expansion module is on, in response to the user switching operating modes, the mode expansion module can cause the display panel to display the selected operating mode for a predetermined amount of time (e.g., 3 seconds). Otherwise, when the mode expansion module is off, the display panel will indicate the gear being employed at the portion of the display panel.

Operating modes of the mode expansion module can include a fuel efficiency mode, a power mode, a performance mode, and/or any other operating mode that can be associated with a vehicle. For example, while operating in a fuel efficiency mode, the mode expansion module can cause the vehicle to operate to consume less fuel, thereby preserving resources available to the vehicle and saving the user in costs for operating the vehicle. While operating in the power mode, the mode expansion module can cause the vehicle to operate to provide more towing and/or hauling capacity, thereby enabling the user from having to obtaining a second vehicle for particular towing and/or hauling jobs. Furthermore, while operating in the performance mode, the mode expansion module can cause the vehicle to operate with a higher range of available velocities and/or accelerations. In this way, as a result of installing the mode expansion module to an existing vehicle, the user of the vehicle will have supplemented their vehicle with additional operating modes that can allow their vehicle to make a more efficient user of available resources.

The above description is provided as an overview of some implementations of the present disclosure. Further description of those implementations, and other implementations, are described in more detail below.

In some implementations, a method implemented by one or more processors is set forth as including operations such as receiving, by a mode expansion module connected to a vehicle, a mode selection output from an existing control switch of the vehicle that includes an engine, an existing engine control module, and a sensor, wherein the sensor provides a sensor output according to an operating condition of the engine and the existing engine control module is configured to provide a command output in response to the sensor signal. The method can further include causing, in response to receiving the mode selection output from the existing control switch of the vehicle, the mode expansion module to operate according to a particular operating mode, wherein the mode expansion module is configured to provide an adapted output according to the particular operating mode. The method can also include receiving, while the mode expansion module is operating according to the particular operating mode and the engine is operating to drive the vehicle, the sensor output from the sensor and the command output from the existing engine control module. The method can further include providing, in response to receiving at least the sensor output or the command output, the adapted output according to the particular operating mode, wherein the adapted output is provided to at least one component of multiple components of the engine. The method can also include causing the engine to operate according to the particular operating mode, at least in response to the mode expansion module providing the adapted output to the at least one component of the engine.

In some implementations, the method can include causing, in response to receiving the command output, the mode expansion module to prevent the command output from reaching the at least one component of the multiple components, wherein the adapted output is provided to the at least one component in lieu of the command output. Additionally, or alternatively, the at least one component is a fuel injector system of the engine, the existing engine control module is configured to provide the signal embodied by the command output to the fuel injector system, and the mode expansion module is configured to provide an adapted signal, embodied by the adapted output, to the fuel injector system of the engine. Additionally, or alternatively, the mode expansion module is configured to operate according to an operating mode that is selected from two or more different operating modes selectable according to a setting of the existing control switch.

Additionally, or alternatively, the vehicle includes a display panel and the method further comprises: determining, in response to receiving the mode selection output from the existing control switch, that the particular operating mode was selected from two or more different operating modes; and providing, by the mode expansion module and based on determining that the particular operating mode was selected, a display output to the existing engine control module, wherein the existing engine control module is connected to the display panel and causes the display panel to provide an identifier that identifies the particular operating mode. Additionally, or alternatively, the vehicle includes a power source that is shared with the mode expansion module, and the method further comprises: receiving, by the mode expansion module, an activation output from the existing control switch; and causing, in response to the mode expansion module receiving the activation output, the mode expansion module to transition from a standby mode to an active mode, wherein the mode expansion module receives power from the power source when operating in the active mode. Additionally, or alternatively, the sensor output is received at a first interface of the mode expansion module, the adapted output is provided from a second interface of the mode expansion module, and the existing engine control module is connected to at least a third interface of the mode expansion module, wherein each of the first interface, the second interface, and the third interface are disposed over different portions of the mode expansion module.

In other implementations, a system is set forth as including a first interface configured to receive a mode selection output from an existing control switch of a vehicle that includes an engine, an existing engine control module, and a sensor, wherein the sensor provides a sensor output according to an operating condition of the engine and the existing engine control module is configured to provide a command output in response to the sensor signal. The system can also include a computing device configured to operate according to a particular operating mode in response to receiving the mode selection output from the existing control switch of the vehicle, wherein computing device is configured to provide an adapted output according to the particular operating mode. The system can further include a second interface configured to receive, while the computing device is operating according to the particular operating mode and the engine is operating to drive the vehicle, the sensor output from the sensor. The system can also include a third interface configured to transmit, at least based on receiving at least the sensor output, an adapted output according to the particular operating mode, wherein the adapted output is provided to at least one component of multiple components of the engine, wherein the adapted output is generated by the computing device and causes the engine to operate according to the particular operating mode, at least in response to the third interface transmitting the adapted output to the at least one component of the engine.

In some implementations, the computing device is further configured to prevent the command output from reaching the at least one component of the multiple components, and generate the adapted output for the at least one component in lieu of the command output. In some implementations, the at least one component is a fuel injector system of the engine, the existing engine control module is configured to provide the signal embodied by the command output to the fuel injector system, and the computing device is further configured to cause an adapted signal embodied by the adapted output to be transmitted to the fuel injector system of the engine. In some implementations, the computing device is further configured to operate according to an operating mode that is selected from two or more different operating modes selectable according to a setting of the existing control switch.

Additionally, or alternatively, the vehicle includes a display panel and the computing device is further configured to: determine, in response to receiving the mode selection output from the existing control switch, that the particular operating mode was selected from two or more different operating modes; and provide, based on the particular operating mode, a display output to the existing engine control module, wherein the existing engine control module is connected to the display panel and causes the display panel to provide an identifier that identifies the particular operating mode. In some implementations, the vehicle includes a power source that is shared with the computing device, and the computing device is further configured to: receive an activation output from the existing control switch; and transitioning, in response to the computing device receiving the activation output, from a standby mode to an active mode, wherein the computing device receives power from the power source when operating in the active mode. In some implementations, the system can further include a body, wherein the computing device is at least partially disposed within the body and each of the first interface, the second interface, and the third interface are disposed over different portions of the body.

In yet other implementations, a non-transitory computer-readable medium is set forth that is configured to store instructions that, when executed by one or more processors, cause the one or more processors to perform operations that include: receiving, by a mode expansion module connected to a vehicle, a mode selection output from an existing control switch of the vehicle that includes an engine, an existing engine control module, and a sensor, wherein the sensor provides a sensor output according to an operating condition of the engine and the existing engine control module is configured to provide a command output in response to the sensor signal. The operations can also include causing, in response to receiving the mode selection output from the existing control switch of the vehicle, the mode expansion module to operate according to a particular operating mode, wherein the mode expansion module is configured to provide an adapted output according to the particular operating mode. The operations can further include receiving, while the mode expansion module is operating according to the particular operating mode and the engine is operating to drive the vehicle, the sensor output from the sensor and the command output from the existing engine control module. The operations can also include providing, in response to receiving at least the sensor output or the command output, the adapted output according to the particular operating mode, wherein the adapted output is provided to at least one component of multiple components of the engine. The operations can further include causing the engine to operate according to the particular operating mode, at least in response to the mode expansion module providing the adapted output to the at least one component of the engine.

In some implementations, the operations can include causing, in response to receiving the command output, the mode expansion module to prevent the command output from reaching the at least one component of the multiple components, wherein the adapted output is provided to the at least one component in lieu of the command output. In some implementations, the at least one component is a fuel injector system of the engine, the existing engine control module is configured to provide the signal embodied by the command output to the fuel injector system, and the mode expansion module is configured to provide an adapted signal, embodied by the adapted output, to the fuel injector system of the engine. In some implementations, the mode expansion module is configured to operate according to an operating mode that is selected from two or more different operating modes selectable according to a setting of the existing control switch.

In some implementations, the vehicle includes a display panel and the operations further include: determining, in response to receiving the mode selection output from the existing control switch, that the particular operating mode was selected from two or more different operating modes. In some implementations, the operations can include providing, by the mode expansion module and based on determining that the particular operating mode was selected, a display output to the existing engine control module, wherein the existing engine control module is connected to the display panel and causes the display panel to provide an identifier that identifies the particular operating mode. Additionally, or alternatively, the vehicle includes a power source that is shared with the mode expansion module, and the operations further include: receiving, by the mode expansion module, an activation output from the existing control switch; and causing, in response to the mode expansion module receiving the activation output, the mode expansion module to transition from a standby mode to an active mode, wherein the mode expansion module receives power from the power source when operating in the active mode.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
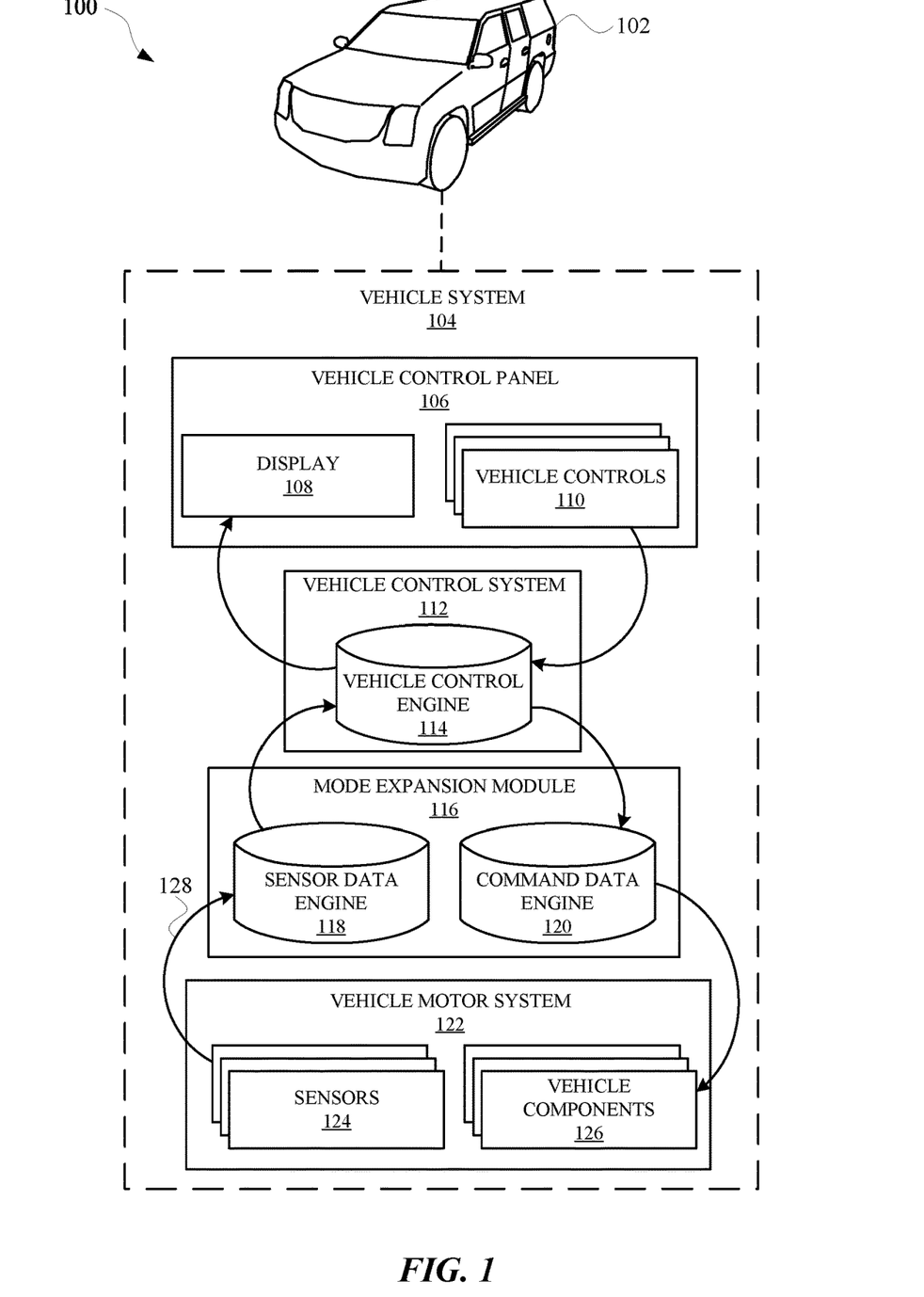
FIG. 1 illustrates a system of a vehicle that includes a mode expansion module 116 in order to provide additional operating modes for the vehicle.

FIG. 1 illustrates a system 100 of a vehicle 104 that includes a mode expansion module 116 in order to provide additional operating modes for the vehicle 102. The vehicle 102 can be, for example, an automobile, and/or any other type of vehicle capable of traversing land, water, air, and/or space. Oftentimes, a vehicle 102 can operate according to a single or finite number of operating modes. As newer operating modes are developed for vehicles to be manufactured in the future, manufacturers typically cannot implement such newer operating modes on vehicles 102 they have already manufactured. As a result, existing vehicles 102 may not be able to employ operating modes that improve their fuel economy, increase their operational lifetime, and/or boost their performance in certain contexts, such as towing a load. In order to overcome these limitations, the implementations set forth herein provide for a mode expansion module 116 capable of increasing a number of operating modes for a vehicle 102 in order to make the vehicle 102 have a better fuel economy, increase their operational lifetime, and/or boost their performance.

The system 100 provides an example of a vehicle system 104 that can be embodied by a vehicle 102 according to some implementations discussed herein. However, while some systems of a vehicle can include other details not provided in FIG. 1, it should be noted that one having ordinary skill in the art would understand the operations of a vehicle, at least for purposes of understanding the implementations set forth herein. For instance, prior to a vehicle 102 incorporating the mode expansion module 116, a vehicle system 104 of the vehicle 102 can include a vehicle control panel 106. The vehicle control panel 106 can include vehicle controls 110 capable of causing one or more signals to be transmitted from the vehicle control panel 106 to a vehicle control system 112 (i.e., one or more vehicle computers). In this way, a user can control the vehicle control panel 106 in order to provide various signals to vehicle components 126 of the vehicle motor system 122. Furthermore, the vehicle control panel 106 (e.g., an analog control panel, digital control panel, and/or a combination thereof) can include a display 108, at which the user can see a status of particular subsystems of the vehicle 102, such as the vehicle control system 112 and/or the vehicle motor system 122. For instance, the display 108 can provide a graphical output for the user based on data that is generated based on a sensor output of sensors 124 of the vehicle motor system 122, and the sensor output can be based on an operating condition of one or more of the vehicle components 126.

In order to provide additional operating modes for the vehicle 102, the mode expansion module 116 can be installed in the vehicle system 104, as illustrated in FIG. 1. Specifically, the mode expansion module 116 can be installed by connecting existing cables of the vehicle 102 to one or more interfaces of the mode expansion module 116, in order that the mode expansion module 116 can intercept signals being transmitted via the existing cables. The mode expansion module 116 can be off or in standby mode (e.g., the mode expansion module 116 can use less power in a standby mode than an on mode, and/or provide less functionality in the standby mode relative to the on mode) until a user selects to turn on the mode expansion module 116 using an activation output from an existing vehicle control 110, such as a cruise control button that would typically enable cruise control. For instance, when the mode expansion module 116 has been installed in the vehicle 102 and the user presses the cruise control button, the mode expansion module 116 can be turned on, instead of turning on cruise control and/or in addition to turning on cruise control.

When the mode expansion module 116 is on, the user can select a mode in which the mode expansion module 116 will operate. Specifically, the user can use a vehicle control 110, such as a button or switch, to cause a signal to be transmitted from the vehicle control panel 106 to the vehicle control system 112. The vehicle control system 112 can include a vehicle control engine 114 configured to process the signal and provide commands to the vehicle components 126 based on the signal. However, when the mode expansion module 116 is installed, the mode expansion module 116 can intercept the command from the vehicle control system 112 to the vehicle motor system 122, or otherwise prevent the command from reaching the vehicle motor system 122. The mode expansion module 116 can receive the command (in a non-limiting example, the command can be embodied as a signal), and process the command in a command data engine 120 of the mode expansion module 116. The command data engine 120 can convert the command from the vehicle control system 112 into a converted signal that is generated based on a selected mode. Additionally, the mode expansion module 116 can communicate with the vehicle control system 112 in response to receiving a selection of the mode, in order to cause the display 108 to at least briefly indicate the mode that has been selected. For instance, a portion of the display 108 that is typically reserved for indicating an existing operating mode of the vehicle 102 can be used when the mode expansion module 116 is on in order to indicate an operating mode of the mode expansion module 116. Furthermore, a signal that would otherwise be provided to the display 108 to indicate the existing operating mode of the vehicle 102 can be mimicked by the mode expansion module 116 in order to cause the display 108 to indicate the operating mode of the mode expansion module 116.

In order for the mode expansion module 116 to effectively provide supplemental, selectable modes for the vehicle 102, the mode expansion module 116 can also manipulate one or more different sensor signals being provided by one or more sensors 124 of the vehicle motor system 122. In some implementations, in order to cause the vehicle 102 to operate according to a selected operating mode of the mode expansion module 116, the mode expansion module 116 can intercept a sensor output from a sensor 124 and adapt the signal according to the selected operating mode. The adapted signal can then be provided to the vehicle control engine 114, which, in response, can issue commands to the vehicle components 126 and/or the mode expansion module 116 in order to cause one or more vehicle components 126 to operate according to the selected operating mode. For instance, in some implementations and as non-limiting examples, the vehicle components 126 can include a fuel injector system, which can include one or more fuel injectors, one or more pressure regulators, and/or one or more fuel pumps. Furthermore, when a selected mode of the mode expansion module 116 corresponds to a fuel efficiency boost mode, the mode expansion module 116 can adapt signals from the vehicle control system 112 in order to cause the vehicle components 126 to operate more efficiently. For example, a converted or adapted output of the vehicle control system 112 can be provided by the mode expansion module 116 to a fuel injector system in order to cause the fuel injector system to operate with less fuel, or use fuel in a more efficient manner.

Additionally, or alternatively, the sensors 124 of the vehicle 102 can include a fuel pressure sensor, a flow sensor, a level and/or volume sensor, and/or any other sensor that can be associated with a motor. When the mode expansion module 116 is operating according to the fuel efficiency boost mode, the mode expansion module 116 can adapt signals from the sensors 124 for the vehicle control engine 114 and/or the command data engine 120. In response to the vehicle control engine 114 and/or the command data engine 120 receiving the adapted signals from the sensors 124, the vehicle control engine 114 and/or the command data engine 120 can provide commands to the vehicle components 126. The commands can cause the vehicle components 126 to operate according to the fuel efficiency boost mode, at least based on the adapted signals from the sensors 124. Additionally, or alternatively, the commands can be provided by the mode expansion module 116 to vehicle control system 112, which can further manipulate current operational parameters of the vehicle 102 according to the selected operating mode of the mode expansion module 116.

When the user selects to change operating modes of the mode expansion module 116, or turn off the mode expansion module 116, the display 108 can indicate that the operating mode has been changed or the mode expansion module 116 has been turned off. For example, the mode expansion module 116 can intercept, from the vehicle motor system 122, data that would indicate the gear being used by the vehicle 102, and adapt the data to correspond to a mode that the mode expansion module is operating in. The mode expansion module 116 can provide the adapted data to the vehicle control system 112 in order to cause the vehicle control system 112 to manipulate the display 108 to indicate the mode (e.g., "1," "2," etc.) that the mode expansion module 116 has been switched into. In other words, the signal that would normally indicate the gear being used by the vehicle 102 can be used by the mode expansion module 116 to cause the display 108 to indicate a current mode of the mode expansion module 116. Such user can take place for a predetermined amount of time (e.g., 3 seconds, and/or any other period of time) in response to the user changing a mode of the mode expansion module 116 and/or turning on or off the mode expansion module 116 at the vehicle controls 110.

Figure 2A:
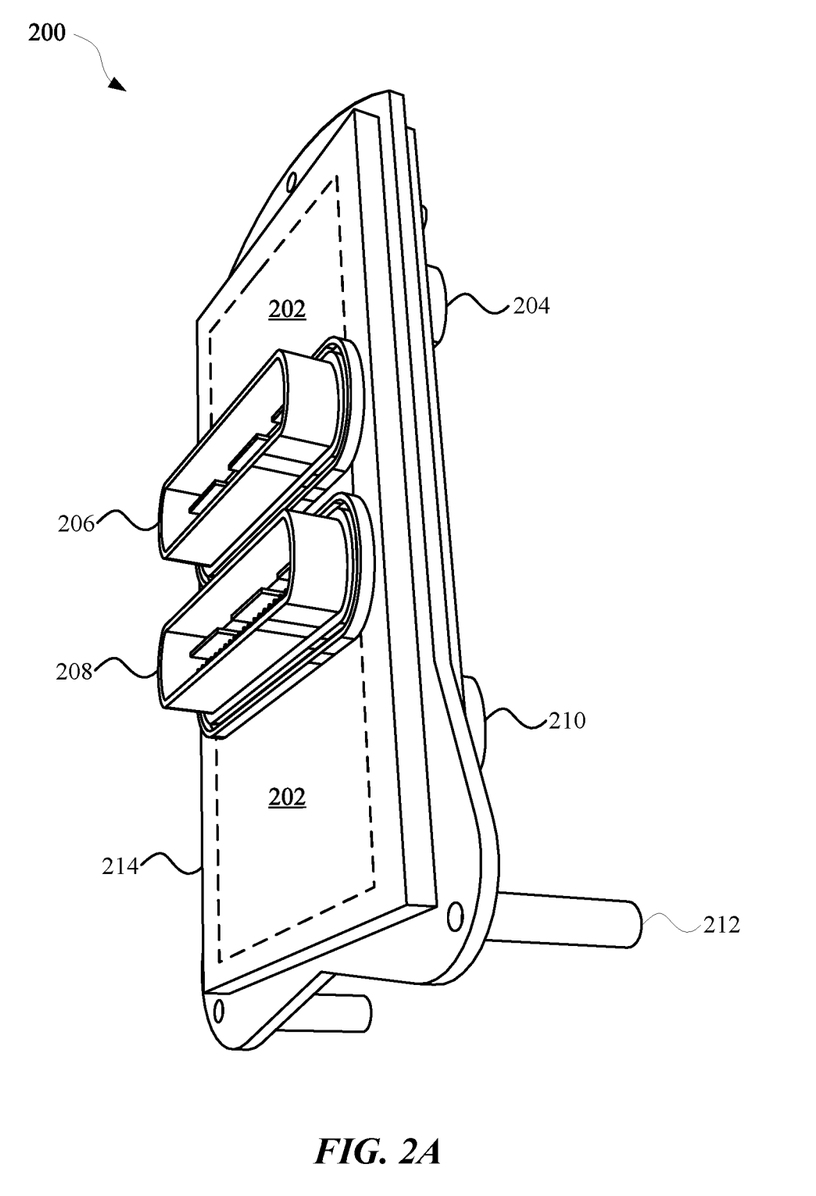
FIG. 2A illustrates a perspective view of a mode expansion module according to some implementations discussed herein.

FIG. 2A illustrates a perspective view 200 of a mode expansion module according to some implementations discussed herein. The mode expansion module can include a computing device 202 that is disposed within a housing 214 of the mode expansion module. The computing device can receive and/or transmit signals via one or more interfaces of the mode expansion module. For example, the mode expansion module can receive sensor outputs (e.g., sensor output 128) at a first interface 206 of the mode expansion module. The sensor outputs can be generated by one or more existing sensors of a vehicle in which the mode expansion module has been installed. The sensor outputs can be provided via one or more cables that are connected between the sensors of the vehicle and the first interface 206. The mode expansion module can also include a second interface 208 with which to transmit signals to one or more components of the vehicle. For example, the second interface 208 can be connected to a vehicle motor system and provide signals to the vehicle motor system via one or more cables connected between the second interface 208 and the vehicle motor system. The mode expansion module can generate and/or adapt signals for one or more components of the vehicle motor system such as, but not limited to, components that control one or more of fuel, air, lubricant, coolant, and/or any other material or apparatus that can be connected to, or provided at, a vehicle.

The mode expansion module can be connected to a vehicle using one or more mounts 212, which can be configured with an aperture for receiving a securing mechanism such as a connector, a screw, and/or any other connectors, adhesives, mounting structures, or assemblies that are suitable for connecting to a vehicle. The mode expansion module can be configured to mount at a location, within a vehicle, that is suitable for intercepting signals being transmitted between one or more subsystems of the vehicle, such as, but not limited to, between a vehicle control system and a vehicle motor system. The computing device 202 can be powered by a power source that is located within the vehicle, and can receive power via one or more interfaces of the mode expansion module.

The mode expansion module can include a third interface 204 and a fourth interface 210, which can be connected to a vehicle control system of the vehicle. For instance, oftentimes a vehicle control system (e.g., vehicle control system 112) of a vehicle can be connected to the sensors and other components of the vehicle. However when the mode expansion module is connected to the vehicle, the mode expansion module can intercept signals being transmitted to and from the sensors, the vehicle control system, and the other components of the vehicle. Such signals can include command signals, power signals, sensor outputs, and or any other signals that can be associated with a vehicle.

Figure 2B:
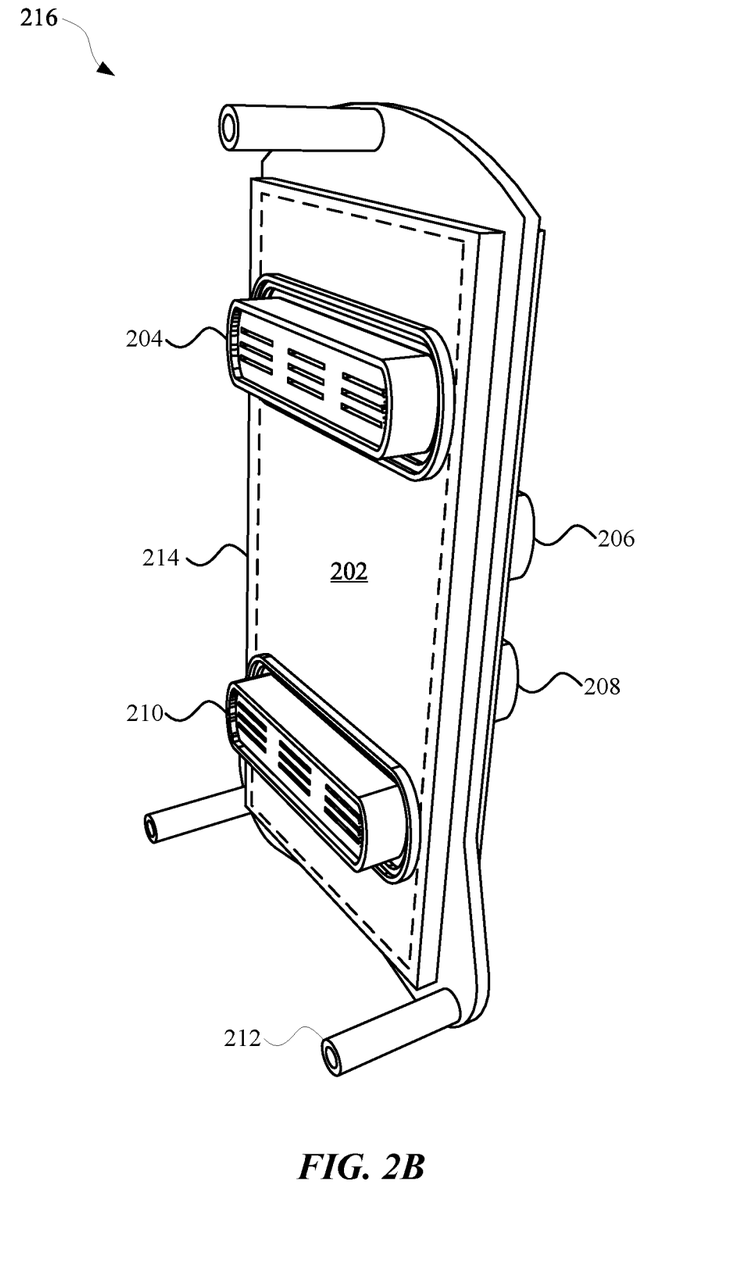
FIG. 2B illustrates a different perspective view of a mode expansion module according to some implementations discussed herein.

FIG. 2B illustrates a different perspective view 216 of a mode expansion module according to some implementations discussed herein. Specifically, the different perspective view 216 illustrates how the third interface 204 and the fourth interface 210 can extend over non-overlapping portions of the housing 214 of the mode expansion module, relative to the first interface 206 and the second interface 208. By providing interfaces that are non-overlapping in this way, heat exchange between the air and the computing device 202 can be promoted, in order to cool one or more processors and/or memory of the computing device 202 during operation. Otherwise, the interfaces may isolate a portion of the computing device 202 from exchanging air with a cooler portion of an environment with which the mode expansion module is installed. Furthermore, the third interface 204 and the fourth interface 210 can include female receptacles capable of receiving one or more existing connectors of a vehicle, and the first interface 206 and second interface 208 can include male connectors capable of connecting to one or more existing receptacles of a vehicle. A receptacle and/or a connector of a vehicle can be connected to one or more cables respectively, and provide a locking mechanism with which to connect to the mode expansion module.

Figure 3:
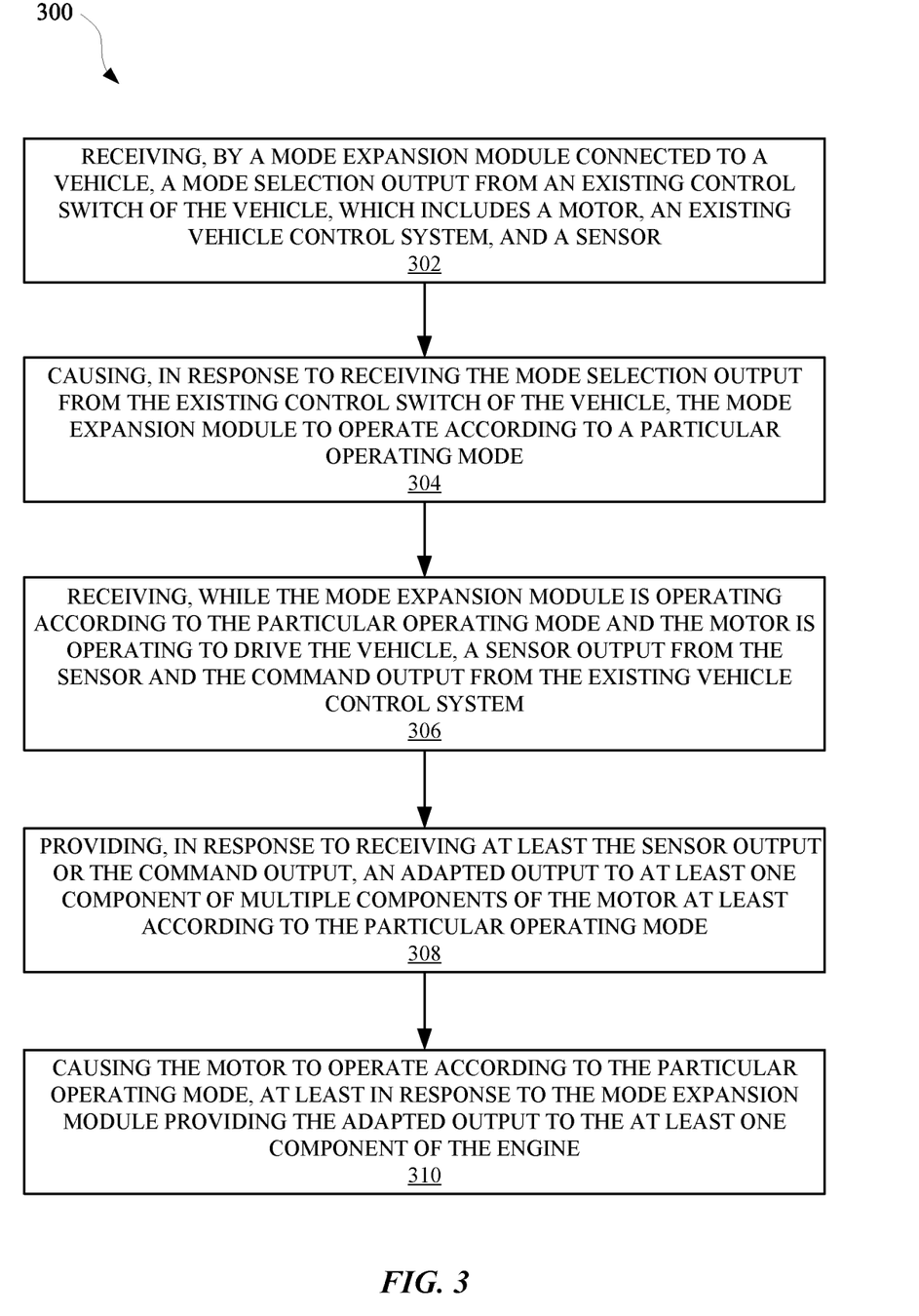
FIG. 3 illustrates a method for operating a vehicle according to one or more supplemental operating modes effectuated by a mode expansion module.

FIG. 3 illustrates a method 300 for operating a vehicle according to one or more supplemental operating modes effectuated by a mode expansion module. The method 300 can be performed by one or more computing devices, such as the mode expansion module discussed herein, and/or any other apparatus or application capable of interacting with one or more vehicle components. The method 300 can include an operation 302 of receiving, by a motor expansion module connected to a vehicle, a mode selection output from an existing control switch (e.g., an existing control switch can be at least one of the vehicle controls 110 of FIG. 1) of the vehicle. The vehicle can include a motor, an existing vehicle control system, and at least one sensor. The mode selection output can be a signal, provided by the existing control switch of the vehicle, which would otherwise be provided to a different component of the vehicle if the mode expansion module was not installed in the vehicle. For example, the existing control switch can be an electrical and/or a mechanical switch that is configured to control a feature of the vehicle, such as cruise control, airflow, temperature, an alarm, fluid flow, gears, and/or any other feature of a vehicle that can be controlled by an electrical and/or a mechanical switch. For instance and without limitation, the existing controls can include an on-off switch for a cruise control mode of the vehicle. When the mode selection output is provided by the on-off switch, the cruise control mode can still be controllable via the existing control switch.

The method 300 may further include an operation 304 of causing, in response to receiving the mode selection output from the existing control switch of the vehicle, the mode expansion module to operate according to a particular operating mode. The particular operating mode can be a latest operating mode selected by the user, a default operating mode that is selected in response to the mode expansion module being turned on, and/or a mode that is identified by data, which is embodied by the mode selection output signal. In some implementations, in response to the mode expansion module receiving the mode selection output, the mode expansion module can be operating in a supplemental mode that would otherwise not be available to the vehicle if the mode expansion module was not connected to the vehicle. Alternatively, or additionally, the method 300 can include an additional operation of the mode expansion module receiving another mode selection output from the existing control switch. The other mode selection output can identify the particular operating mode and/or otherwise cause the mode expansion module to operate according to the particular operating mode.

The method 300 can further include an operation 306 of receiving, while the mode expansion module is operating according to the particular operating mode and the motor is operating to drive the vehicle, a sensor output from the sensor and a command output from the existing vehicle control system. The sensor output can typically be used by the vehicle to modify certain operating parameters of the vehicle, such as modifying air flow to the motor, adjusting an input of fuel that is provided to the engine, changing a setting of the transmission, and/or any other adjustment that can be made to an operating parameter of a vehicle. However, when the mode expansion module receives the sensor output, the sensor output can be received and adapted in order to cause the vehicle control system to operate according to the particular operating mode of the mode expansion module. For instance, a sensor output corresponding to a fuel sensor can be adjusted to indicate that more fuel than necessary has been provided to the motor, in order to cause the vehicle control system to respond by limiting the amount of fuel being provided to the motor. In this way, the mode expansion module effectuates the operating mode (e.g., a fuel efficiency mode) by causing other subsystems of the vehicle to conform to the operating mode.

A command output can typically be used by one or more components of the vehicle in order to modify particular operating parameters of the vehicle. For instance, a command output can be provided by the vehicle control system in order to cause an air intake of the vehicle to adjust to increase or decrease an amount of air being provided to an intake of the motor. However, the mode expansion module can receive one or more command outputs from the vehicle control system and adapt them according to a particular operating mode of the mode expansion module. For example, a command output for modifying a position of an air intake valve can be adjusted to cause additional air to enter the motor when the mode expansion module is operating in a fuel efficiency mode and/or a power increasing mode. As a result, the vehicle will have additional operating modes for the user to select from, without having to purchase a new vehicle, thereby making a more productive use of resources and energy, as opposed to relying on manufacturers to make an entirely new vehicle.

The method 300 can also include an operation 308 of providing, in response to receiving at least the sensor output and/or the command output, an adapted output to at least one component of multiple components of the motor, at least according to the particular operating mode. In some implementations, an adapted output from the mode expansion module can go directly or indirectly to one or more components of the motor and/or another portion of the vehicle. For example, the adapted output could be provided to an existing computer of the vehicle before affecting a subsystem of the vehicle, such as a fuel system. In some implementations, the adapted output can be generated by one or more processors of the mode expansion module using data provided at least one or more memory devices of the mode expansion module. The sensor output and/or command output received by the mode expansion module can be modified according to the one or more processors, at least in accordance with a selected operating mode. For instance, an analog or digital property of the sensor output and/or the command output can be modified according to the particular operating mode. Additionally, or alternatively, properties of the sensor output and/or the command output, such as amplitude, phase, frequency, and/or any other signal characteristic of the sensor output and/or the command output can be adjusted according to the particular operating mode. Additionally, or alternatively, data characterizing the sensor output and/or the command output can be stored at the mode expansion module, subsequently modified according to the operating mode, and the modified data can be converted to one or more signals that are provided to the at least one component of the multiple components of the motor and/or the vehicle.

The method 300 can further include an operation 310 of causing the motor and/or vehicle to operate according to the particular operating mode, at least in response to the mode expansion module providing the adapted output to the at least one component of the motor and/or the vehicle. The adapted output can change in response to variations in the sensor output and/or the command output being received by the mode expansion module. Furthermore, the mode expansion module can provide a variety of adapted outputs while operating in a particular operating mode and change output the adapted outputs are provided when switched into a different operating mode. A variety of operating modes available by the mode expansion module can include an efficiency mode (e.g., for improving fuel efficiency), power mode (e.g., for increasing a towing capacity, and/or a performance mode (e.g., for at least increasing a range of available speeds of a vehicle). By making such modes available to existing vehicles, manufacturers do not have to used materials and time manufacturing another vehicle with such modes. Further, such modes can reduce an amount of fuel consumed by the vehicle, thereby making the operations of the vehicle cheaper and eco-friendly.

Figure 4:
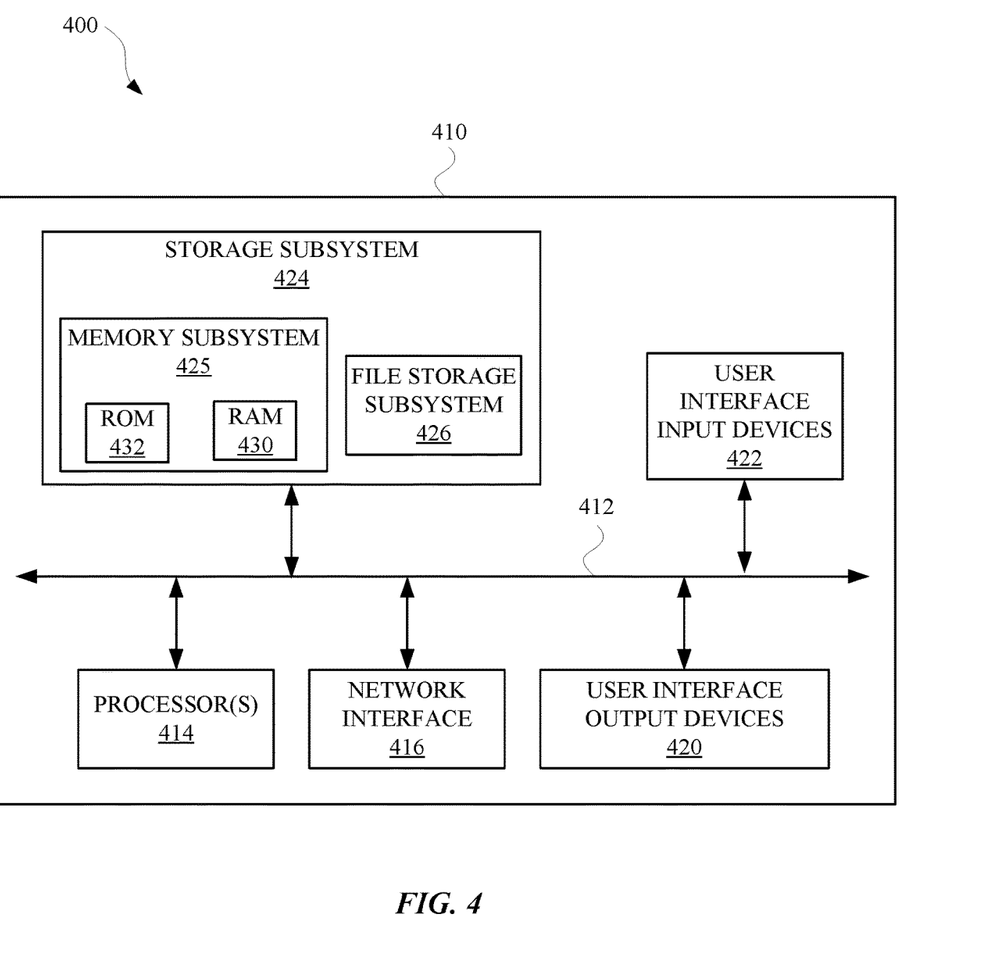
FIG. 4 is a block diagram of an example computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include, but is not limited to, a cathode ray tube (CRT), a flat-panel device such as a liquid crystal display (LCD), organic light emitting diode (OLED), analog indication, a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of vehicle system 104, vehicle control panel 106, vehicle controls 110, vehicle control system 112, vehicle control engine 114, mode expansion module 116, sensor data engine 118, command data engine 120, vehicle motor system 122, and/or any other apparatus, module, and/or operation discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, flash memory, EEPROM memory, an optical drive, and/or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
    receiving, by a mode expansion module connected to a vehicle, a mode selection output from an existing control switch of the vehicle that includes an engine, an existing engine control module, and a sensor, wherein the sensor provides a sensor output according to an operating condition of the engine and the existing engine control module is configured to provide a command output in response to the sensor output;
    causing, in response to receiving the mode selection output from the existing control switch of the vehicle, the mode expansion module to operate according to a particular operating mode, wherein the mode expansion module is configured to provide an adapted output according to the particular operating mode;
    receiving, while the mode expansion module is operating according to the particular operating mode and the engine is operating to drive the vehicle, the sensor output from the sensor and the command output from the existing engine control module;
    providing, in response to receiving at least the sensor output or the command output, the adapted output according to the particular operating mode, wherein the adapted output is provided to at least one component of multiple components of the engine; and
    causing the engine to operate according to the particular operating mode, at least in response to the mode expansion module providing the adapted output to the at least one component of the engine.

2. The method of claim 1, further comprising:
    causing, in response to receiving the command output, the mode expansion module to prevent the command output from reaching the at least one component of the multiple components,
    wherein the adapted output is provided to the at least one component in lieu of the command output.

3. The method of claim 2, wherein the at least one component is a fuel injector system of the engine, the existing engine control module is configured to provide the sensor output embodied by the command output to the fuel injector system, and the mode expansion module is configured to provide an adapted signal, embodied by the adapted output, to the fuel injector system of the engine.

4. The method of claim 3, wherein the mode expansion module is configured to operate according to an operating mode that is selected from two or more different operating modes selectable according to a setting of the existing control switch.

5. The method of claim 4, wherein the vehicle includes a display panel and the method further comprises:
    determining, in response to receiving the mode selection output from the existing control switch, that the particular operating mode was selected from two or more different operating modes; and
    providing, by the mode expansion module and based on determining that the particular operating mode was selected, a display output to the existing engine control module, wherein the existing engine control module is connected to the display panel and causes the display panel to provide an identifier that identifies the particular operating mode.

6. The method of claim 1, wherein the vehicle includes a power source that is shared with the mode expansion module, and the method further comprises:
    receiving, by the mode expansion module, an activation output from the existing control switch; and
    causing, in response to the mode expansion module receiving the activation output, the mode expansion module to transition from a standby mode to an active mode, wherein the mode expansion module receives power from the power source when operating in the active mode.

7. The method of claim 1, wherein the sensor output is received at a first interface of the mode expansion module, the adapted output is provided from a second interface of the mode expansion module, and the existing engine control module is connected to at least a third interface of the mode expansion module, wherein each of the first interface, the second interface, and the third interface are disposed over different portions of the mode expansion module.

8. A system, comprising:
a first interface configured to receive a mode selection output from an existing control switch of a vehicle that includes an engine, an existing engine control module, and a sensor, wherein the sensor provides a sensor output according to an operating condition of the engine and the existing engine control module is configured to provide a command output in response to the sensor output;
a computing device configured to operate according to a particular operating mode in response to receiving the mode selection output from the existing control switch of the vehicle, wherein computing device is configured to provide an adapted output according to the particular operating mode;
a second interface configured to receive, while the computing device is operating according to the particular operating mode and the engine is operating to drive the vehicle, the sensor output from the sensor; and
a third interface configured to transmit, at least based on receiving at least the sensor output, the adapted output according to the particular operating mode, wherein the adapted output is provided to at least one component of multiple components of the engine,
wherein the adapted output is generated by the computing device and causes the engine to operate according to the particular operating mode, at least in response to the third interface transmitting the adapted output to the at least one component of the engine.

9. The system of claim 8, wherein the computing device is further configured to prevent the command output from reaching the at least one component of the multiple components, and generate the adapted output for the at least one component in lieu of the command output.

10. The system of claim 9, wherein the at least one component is a fuel injector system of the engine, the existing engine control module is configured to provide the sensor output embodied by the command output to the fuel injector system, and the computing device is further configured to cause an adapted signal embodied by the adapted output to be transmitted to the fuel injector system of the engine.

11. The system of claim 10, wherein the computing device is further configured to operate according to an operating mode that is selected from two or more different operating modes selectable according to a setting of the existing control switch.

12. The system of claim 11, wherein the vehicle includes a display panel and the computing device is further configured to:
determine, in response to receiving the mode selection output from the existing control switch, that the particular operating mode was selected from two or more different operating modes; and
provide, based on the particular operating mode, a display output to the existing engine control module, wherein the existing engine control module is connected to the display panel and causes the display panel to provide an identifier that identifies the particular operating mode.

13. The system of claim 8, wherein the vehicle includes a power source that is shared with the computing device, and the computing device is further configured to:
receive an activation output from the existing control switch; and transitioning, in response to the computing device receiving the activation output, from a standby mode to an active mode, wherein the computing device receives power from the power source when operating in the active mode.

14. The system of claim 8, further comprising a body, wherein the computing device is at least partially disposed within the body and each of the first interface, the second interface, and the third interface are disposed over different portions of the body.

15. A non-transitory computer-readable medium configured to store instructions that, when executed by one or more processors, cause the one or more processors to perform operations that include:
receiving, by a mode expansion module connected to a vehicle, a mode selection output from an existing control switch of the vehicle that includes an engine, an existing engine control module, and a sensor, wherein the sensor provides a sensor output according to an operating condition of the engine and the existing engine control module is configured to provide a command output in response to the sensor output;
causing, in response to receiving the mode selection output from the existing control switch of the vehicle, the mode expansion module to operate according to a particular operating mode, wherein the mode expansion module is configured to provide an adapted output according to the particular operating mode;
receiving, while the mode expansion module is operating according to the particular operating mode and the engine is operating to drive the vehicle, the sensor output from the sensor and the command output from the existing engine control module;
providing, in response to receiving at least the sensor output or the command output, the adapted output according to the particular operating mode, wherein the adapted output is provided to at least one component of multiple components of the engine; and
causing the engine to operate according to the particular operating mode, at least in response to the mode expansion module providing the adapted output to the at least one component of the engine.

16. The non-transitory computer-readable medium of claim 15, wherein the operations further include:
causing, in response to receiving the command output, the mode expansion module to prevent the command output from reaching the at least one component of the multiple components,
wherein the adapted output is provided to the at least one component in lieu of the command output.

17. The non-transitory computer-readable medium of claim 16, wherein the at least one component is a fuel injector system of the engine, the existing engine control module is configured to provide the sensor output embodied by the command output to the fuel injector system, and the mode expansion module is configured to provide an adapted signal, embodied by the adapted output, to the fuel injector system of the engine.

18. The non-transitory computer-readable medium of claim 17, wherein the mode expansion module is configured to operate according to an operating mode that is selected from two or more different operating modes selectable according to a setting of the existing control switch.

19. The non-transitory computer-readable medium of claim 18, wherein the vehicle includes a display panel and the operations further include:

determining, in response to receiving the mode selection output from the existing control switch, that the particular operating mode was selected from two or more different operating modes; and providing, by the mode expansion module and based on determining that the particular operating mode was selected, a display output to the existing engine control module, wherein the existing engine control module is connected to the display panel and causes the display panel to provide an identifier that identifies the particular operating mode.

20. The non-transitory computer-readable medium of claim 15, wherein the vehicle includes a power source that is shared with the mode expansion module, and the operations further include:

receiving, by the mode expansion module, an activation output from the existing control switch; and causing, in response to the mode expansion module receiving the activation output, the mode expansion module to transition from a standby mode to an active mode, wherein the mode expansion module receives power from the power source when operating in the active mode.

\* \* \* \* \*